(12) United States Patent  
Rovati (10) Patent No.: US 6,581,147 B1  
(45) Date of Patent: Jun. 17, 2003

(54) DATA FLOW CONTROL CIRCUITRY INCLUDING BUFFER CIRCUITRY THAT STORES DATA ACCESS REQUESTS AND DATA

(75) Inventor: Fabrizio Rovati, Cinisello Balsamo (IT)

(73) Assignee: STMicroelectronics Limited, Bristol (GB)

( * ) Notice: Subject to any disclaimer, the term of this patent is extended or adjusted under 35 U.S.C. 154(b) by 0 days.

(21) Appl. No.: 09/481,098

(22) Filed: Jan. 11, 2000

(30) Foreign Application Priority Data

Jan. 11, 1999 (GB) .............................................. 9900520

(51) Int. Cl.[7] .............................................. G06F 12/00
(52) U.S. Cl. ....................... 711/167; 711/154; 711/126; 710/52
(58) Field of Search ............................... 710/52, 53, 54, 710/57, 56; 711/167, 104, 154, 123, 125, 126; 365/63

(56) References Cited

U.S. PATENT DOCUMENTS

| | | | | |
|---|---|---|---|---|
| 4,463,443 A | * | 7/1984 | Frankel et al. ................. | 710/60 |
| 4,539,637 A | * | 9/1985 | DeBruler ..................... | 709/201 |
| 4,924,375 A | | 5/1990 | Fung et al. | |
| 5,022,004 A | | 6/1991 | Kurtze et al. | |
| 5,265,229 A | * | 11/1993 | Sareen ..................... | 340/855.4 |
| 5,502,835 A | | 3/1996 | Le et al. | |
| 5,590,304 A | | 12/1996 | Adkisson | |
| 5,615,355 A | | 3/1997 | Wagner | |
| 5,659,687 A | | 8/1997 | Kim et al. | |
| 5,671,445 A | * | 9/1997 | Gluyas et al. ................. | 710/53 |
| 5,765,182 A | | 6/1998 | Lau et al. | |
| 5,808,629 A | * | 9/1998 | Nally et al. .................. | 345/213 |
| 5,860,096 A | * | 1/1999 | Undy et al. .................. | 711/122 |
| 5,950,229 A | | 9/1999 | Jeddeloh | |
| 5,974,507 A | * | 10/1999 | Arimilli et al. .............. | 711/133 |
| 5,991,232 A | * | 11/1999 | Matsumura et al. ......... | 365/201 |
| 6,044,416 A | * | 3/2000 | Hasan .......................... | 710/52 |
| 6,088,744 A | * | 7/2000 | Hill .............................. | 710/53 |
| 6,205,543 B1 | * | 3/2001 | Tremblay et al. ............ | 712/228 |
| 6,219,728 B1 | * | 4/2001 | Yin ............................... | 710/52 |
| 6,240,495 B1 | * | 5/2001 | Usui ........................... | 711/167 |
| 6,256,218 B1 | * | 7/2001 | Moon .......................... | 365/63 |

FOREIGN PATENT DOCUMENTS

| | | |
|---|---|---|
| EP | 0 733 980 A1 | 9/1996 |
| EP | 0 962 855 A1 | 12/1999 |
| GB | 1 369 184 | 10/1974 |
| GB | 2 343 268 | 5/2000 |
| WO | WO 96/30838 | 10/1996 |

\* cited by examiner

*Primary Examiner*—Matthew Kim  
*Assistant Examiner*—Matthew D. Anderson  
(74) *Attorney, Agent, or Firm*—Lisa K. Jorgenson; Robert Iannucci; Seed IP Law Group PLLC

(57) ABSTRACT

Interface circuitry is disclosed for interfacing between an operational circuit, a microprocessor, for example, and data storage circuitry, for example direct Rambus memory. The interface circuitry comprises buffer circuitry coupled between the operational circuitry and the data storage circuitry which is arranged to store data access requests received from the operational circuitry and to store data retrieved from the data storage circuitry. The buffer circuitry comprises an output for supplying the data access request signals to the data storage circuitry and to supply the stored data from the data storage circuitry to the operational circuitry.

In use, the number of stored data access request signals decreases as the amount of stored data from the data storage circuitry increases. Similarly, the number of stored data access request signals increases as the amount of stored data from the data storage circuitry decreases. The overall effect is that in use, the sum of this stored data access request signals and stored data in the buffer circuitry remains substantially constant.

5 Claims, 7 Drawing Sheets

DATA FLOW CONTROL CIRCUITRY INCLUDING BUFFER CIRCUITRY THAT STORES DATA ACCESS REQUESTS AND DATA

TECHNICAL FIELD OF THE INVENTION

This invention relates to controlling the flow of data between an operational circuit and a data storage circuit. In particular, but not exclusively, the operational circuit may be a device which uses the data storage circuit and the data storage circuit may be a memory.

BACKGROUND OF THE INVENTION

In known systems using integrated circuits one of the areas which restricts the overall system performance is the interface between the memory device and the internal bus of an operational circuit which accesses that memory. A number of memory devices have been recently introduced which have improved data transfer rates in comparison to conventional memory devices. For example, conventional SDRAM (synchronous dynamic random access memory) typically has a data transfer rate of 32 bits at 100 MHz. An improvement to this is double data rate (DDR) SDRAM which is capable of transferring double the data rate than a conventional SDRAM and hence has a data transfer rate of 32 bits at 200 MHz. There are also available memory devices known as Direct Rambus memories (RDRAM Rambus Dynamic Random Access Memory) which have a transfer rate of 16 bits at 800 MHz. 'Rambus' and 'Direct Rambus' are trade marks of Rambus Inc.

Figure 1:
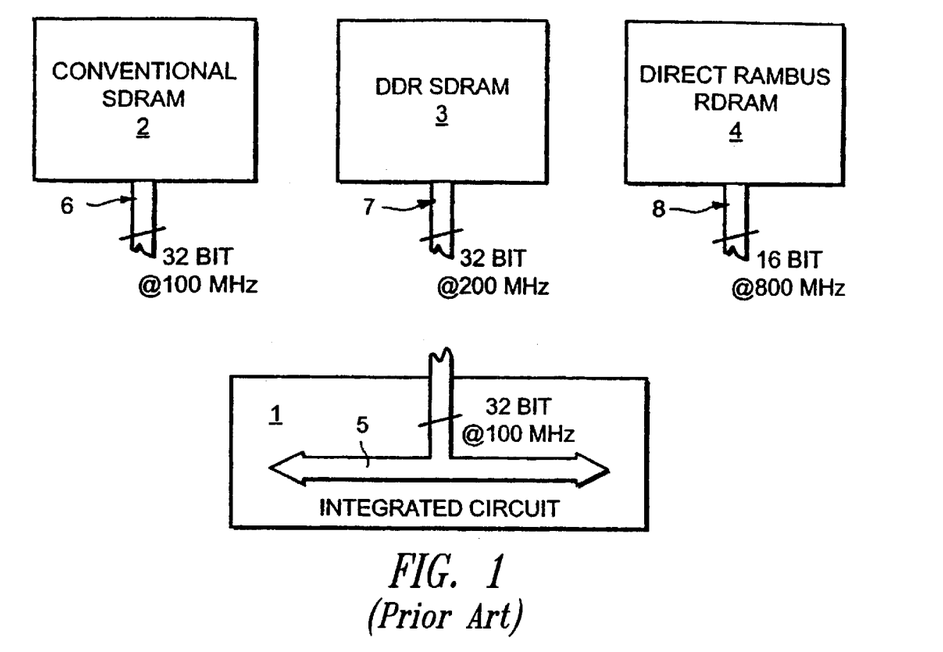
FIG. 1 schematically shows a conventional integrated circuit device and three data storage devices to which the integrated circuit device may be connected.

Present conventional integrated circuits typically have an internal system bus with a data transfer rate of 32 bits at 100 MHz. FIG. 1 schematically illustrates a conventional integrated circuit 1 with an internal system bus 5 and three known memory devices, a conventional SDRAM 2, a double data rate SDRAM 3 and a Direct Rambus memory 4. (In practice only one of the three memory devices is provided). Each of the memory devices 2, 3 and 4 has an output bus which in use is coupled to the internal system bus 5 of the integrated circuit. The output bus 6 of the conventional SDRAM 2 has a data transfer rate of 32 bits at 100 MHz and is therefore entirely compatible with the internal bus 5 of the integrated circuit 1, which as shown, also has a data transfer rate of 32 bits at 100 MHz. However, the output bus 7 of the DDR SDRAM 3 has a data transfer rate of 32 bits at 200 MHz and the output bus 8 of the Direct Rambus memory 4 has a data transfer rate of 16 bits at 800 MHz. Accordingly the output buses 7 and 8 of the DDR SDRAM 3 and the Direct Rambus memory 4 are not compatible with the internal system bus 5 of the integrated circuit 1 in terms of data rate. Accordingly, with the existing conventional internal bus system of the integrated circuit, the higher data transfer rate of the DDR SDRAM and the Direct Rambus cannot be readily used.

Figure 2:
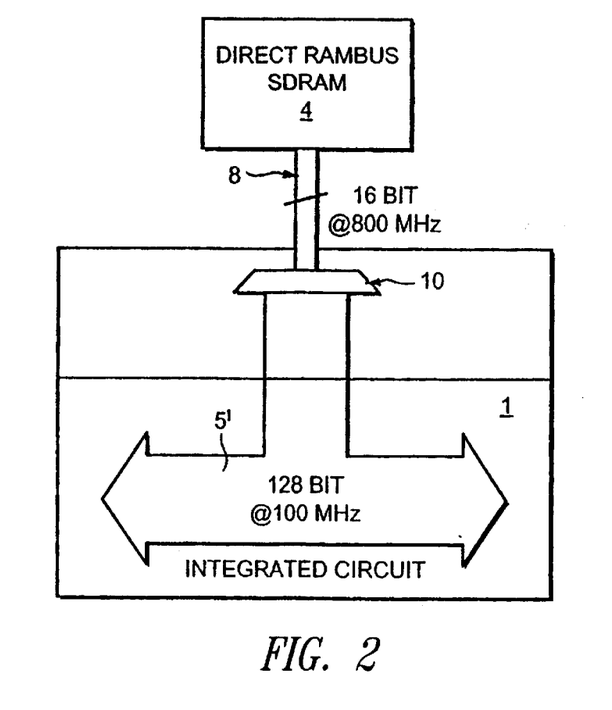
FIG. 2 shows an arrangement for connecting a Direct Rambus memory to a conventional integrated circuit.

To exploit the increased transfer rate of the faster memory devices, the width of the internal bus of the operational integrated circuit could be increased. For example, for a Direct Rambus memory with a transfer rate of 16 bits at 800 MHz, the internal bus of the operational integrated circuit would have to be increased to a 128 bit bus operating at 100 MHz. As this is four times the present conventional bus width the resulting integrated circuit would be much more complex and require increased effort in designing the layout of the interconnects within the integrated circuit and would also consume a much larger area of silicon. This is disadvantageous. FIG. 2 illustrates an example of a Direct Rambus 4 connected to an integrated circuit 1, the integrated circuit having an internal system bus 5 with a transfer rate of 128 bits at 100 MHz. At the interface between the Direct Rambus memory 4 and the integrated circuit 1, a demultiplexer 10 would be required to spread the short 16 bit words from the Direct Rambus onto the 128 bit wide internal bus of the integrated circuit. The addition of a demultiplexer 10 further increases the complexity and required silicon area of the integrated circuit.

The speed of the internal bus of the integrated circuit could be increased to match that of the memory device connected to it. However, this would require redesigning the integrated circuit and in practice, the internal buses of integrated circuits which represent the current state of the art already typically operate at a speed close to the current maximum possible speed.

SUMMARY OF THE INVENTION

It is an aim of embodiments of the present invention to provide an improved interface between data storage devices with a relatively high data transfer rate and the internal bus system of an integrated circuit operating with a relatively low data transfer which overcomes or at least mitigates against the problems described hereinbefore.

According to one aspect of the present invention there is provided circuitry for controlling a flow of data comprising: an operational circuit arranged to generate at least one data access request; data storage circuitry arranged to output or store data in response to receiving said at least one data access request signal; and buffer circuitry coupled between the operational circuitry and the data storage circuitry arranged to store said at least one data access request from the operational circuitry and store data from the data storage circuitry, wherein in use the number of stored data access request signals decreases as the amount of stored data from the data storage circuitry increases and the number of stored data access request signals increases as the amount of stored data from the data storage circuitry decreases.

According to a second aspect of the present invention there is provided a method for controlling flow of data comprising the steps: receiving data access request signals at the input of buffer circuitry; storing said data request signals in the buffer circuitry; receiving data at said input of the buffer circuitry; and storing said data in the buffer circuitry.

BRIEF DESCRIPTION OF THE DRAWINGS

For a better understanding of the present invention and as to how the same may be carried into effect, reference will now be made by way of example only to the accompanying drawings in which.

DETAILED DESCRIPTION OF THE INVENTION

Figure 3:
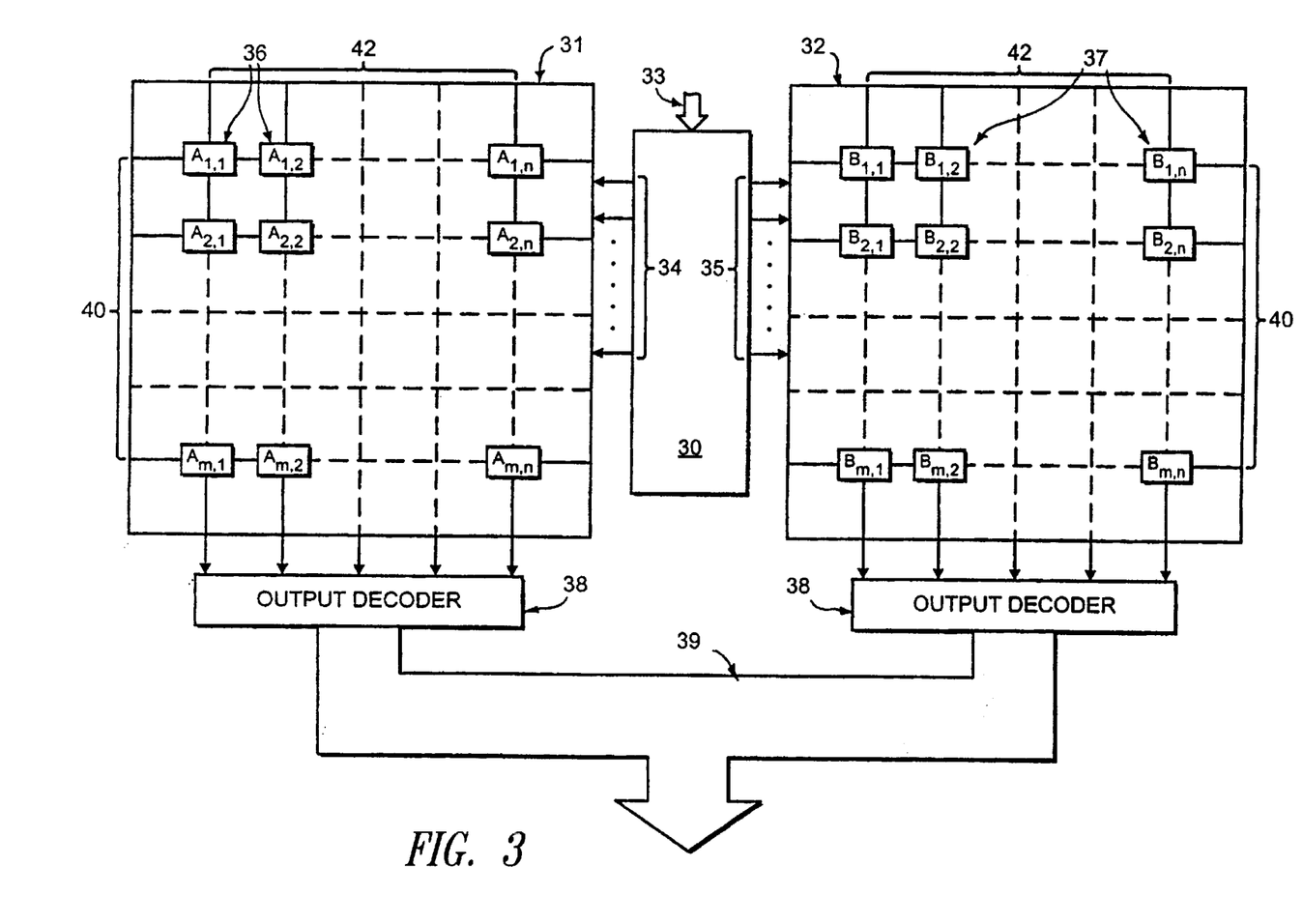
FIG. 3 shows the structure of a conventional DRAM device.

Reference will now be made to FIG. 3 which shows a dynamic random access memory (DRAM) device. The actual memory cells 36, 37 which store the data are arranged in one or more banks 31, 32 consisting of a number of rows 40 and columns 42. In each of the two banks shown, there are m rows and n columns. Each row 40 of a bank 31, 32 is known as a page. To access the data (referred to as a word) stored at a particular cell within a memory bank 31, 32 it is necessary to activate all of the memory cells which are in the same row 40 as the memory cell 36, 37 which it is desired to access. The act of activating a complete row of a memory array is referred to as opening a page. A particular cell 36, 37 is accessed by activating the associated column. Data output from the cell 36, 37 is read by an output decoder 38, which transfers the data to the output bus 39. To carry out this function one or more control signals 34, 35 are produced by an internal decoder 30.

A page must be opened before data can be accessed from a memory cell contained within that page. Therefore there is a delay of several cycles introduced between the memory receiving a request to access a memory cell 36, 37 and that memory cell becoming available to transfer data. A further delay of several cycles is introduced as it is necessary to close any previously opened pages before the next page can be opened. For example, in a conventional SDRAM, to retrieve 8 words of data, it takes 3 clock cycles to close a previous page, 6 cycles to open the next page and retrieve the first-word of data and a further 7 clock cycles to transfer the requested data from the memory. In a Direct Rambus memory device, the delay necessary to close a page and open a subsequent page is 9 cycles and the time taken to transfer the remaining data from the memory is a further 1 cycle.

Figure 4:
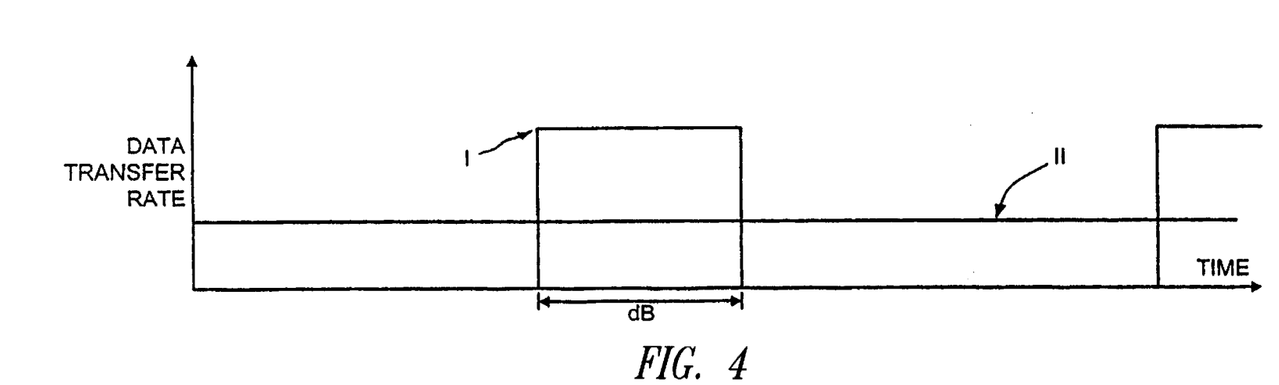
FIG. 4 shows instantaneous and average data transfer rates for a Direct Rambus memory.

Because of the delay required to close and open pages, the instantaneous data transfer from the memory device is not constant. FIG. 4 shows the variation of instantaneous data transfer from a Direct Rambus device with respect to time. The instantaneous data transfer rate is shown by the line I and it can be seen that the memory only in fact outputs data at a high transfer rate for short periods of time or bursts. One such period is referenced db in FIG. 4. The average data transfer rate over a longer period of time is shown by line II and is much lower than the peak data transfer rate of the memory device.

As stated hereinbefore, a Direct Rambus memory device requires a total of 10 cycles to output data from the memory which has been requested by the integrated circuit (3 cycles to close a page and 6 cycles to open a new page and retrieve the first data word and 1 cycle to retrieve the remaining data words). As the transfer rate of a Direct Rambus memory device is 16 bits at 800 MHz, the average rate of data transfer is 320 M bytes per second. An internal bus of an integrated circuit operating at 32 bits at 100 MHz is capable of sustaining a data transfer rate of 400 M bytes per second.

Figure 5:
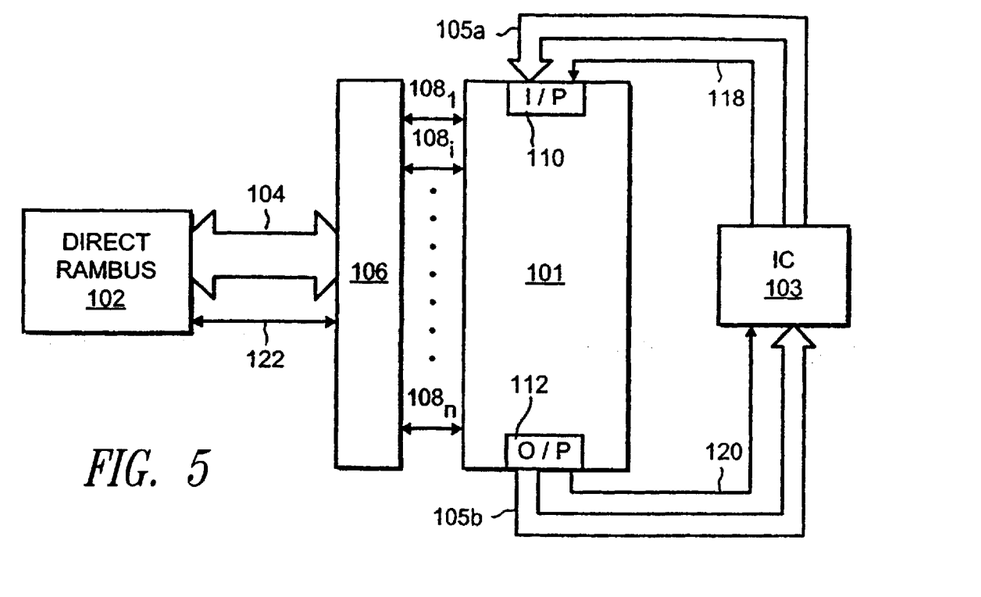
FIG. 5 shows a Direct Rambus connected to an integrated circuit via an interface according to an embodiment of the present invention.

Reference is now made to FIG. 5 which shows a Direct Rambus 102 connected to an integrated circuit 103 via an interface 101, 106. To take advantage of the higher average data transfer rate of a conventional internal bus of a integrated circuit in comparison to the average data transfer rate of a Direct Rambus memory device, the interface 101, 106 is provided between the Direct Rambus 102 and the integrated circuit 103. This interface 101, 106 is capable of smoothing out the peaks in the instantaneous data transfer rate of the Direct Rambus and providing an output to the internal bus of the integrated circuit 103 which operates at least at the average data transfer rate of the Direct Rambus 102. It is preferred that the average data transfer rate of the Direct Rambus 102 be the same as the internal bus of the integrated circuit 103.

In FIG. 5, the Direct Rambus memory device 102 is connected to the internal bus of integrated circuit 103 via the interface 101, 106 which consists of a buffer 101 and a controller 106. Connected between the Direct Rambus 102 and the integrated circuit 103 is the buffer 101 and the interface controller 106. The buffer 101 has an input 110 and an output 112. Connected between the input 110 of the buffer 101 and the integrated circuit 103 is a first data bus 105a which has a transfer rate equal to that of the internal bus of the integrated circuit 103, i.e. 32 bits at 100 MHz. Also connected between the input 110 of the buffer 101 and the integrated circuit 103 is a first control line 118. Connected from the output 112 of the buffer 101 to the integrated circuit 103 is a second data bus 105b which has a transfer rate equal to the first data bus 105a. It will be appreciated that first and second data buses 105a and 105b in fact comprise the same data bus and are shown separately in FIG. 5 merely for the sake of convenience. Also connected between the output 112 of the buffer 101 and the integrated circuit 103 is a second control line 120.

Connected between the Direct Rambus 102 and the interface controller 106 is a third data bus 104. The third data bus 104 has a data transfer rate of 128 bits at 100 MHz which is equal to the peak instantaneous data transfer rate of the Direct Rambus. Also connected between the Direct Rambus 102 and the interface controller 106 is a third Direct Rambus control line 122. The interface controller 106 is connected to the buffer 101 by an interface bus 108. The interface bus 108 comprises a plurality of individual data transfer lines $108_1$, $108_i$, ..., $108_n$. There are n data transfer lines provided where n is the number of storage locations within buffer 101. In practice, the buffer 101 may be a FIFO (first-in-first-out) register which passes data from its input to the output.

The operation of the circuit shown in FIG. 5 will now be described. Beginning from the initial conditions of the buffer 101 being empty and the Direct Rambus 102 having all its pages closed, the integrated circuit 103 loads a memory request, MEM REQ, into the buffer 101 via the first data bus 105a. The memory request M-REQ may be a request to access (read) data stored in the Direct Rambus memory 102 or it may be a request to write data to the Direct Rambus memory 102. If the memory request is a request to write data to the Direct Rambus memory 102, the data to be written is also loaded into the buffer 101 via the data bus 105a. Control signals for controlling the operation of the buffer 101 are also output from the integrated circuit 103 via the first control line 118.

The interface controller 106 scans the storage locations of the buffer 101 in turn, starting from the nth data storage location and when a data storage location is scanned which contains a memory request the memory request is output from the buffer 101 via the corresponding data transfer line 108n to the interface controller 106. The interface controller 106 scans a number of data storage locations within buffer 101 and multiplexes the memory request signals and any corresponding data onto the third data bus 104 such that the memory requests are input to the Direct Rambus 102. The Direct Rambus 102 now begins the action of opening a page in the memory array in order to supply the requested data or to write the supplied data in the relevant memory location. As previously discussed, there is a delay of 6 cycles while the page is opened before any data can be output from the Direct Rambus 102. During this delay, the integrated circuit 103 may be outputting further memory requests to the buffer 101. These further memory requests are stored in the buffer 101 during the delay period which occurs while the Direct Rambus 102 is opening the page associated with the first memory request.

When the Direct Rambus 102 has opened the page associated with the first memory request, if that memory request is a request to access data from the Direct Rambus, the requested data is then transferred from the Direct Rambus 102 via the third data bus 104 to the interface controller 106. Control signals associated with controlling the input and output from the Direct Rambus 102 are passed between the Direct Rambus 102 and the interface controller 106 by the third control line 122. The interface controller 106 demultiplexes the data received from the Direct Rambus 102 and inputs it via data transfer lines $108_i$ to empty data storage locations within buffer 101. The interface controller 106 then scans the data storage locations within the buffer 101 for the next memory requests which are to be served. The data accessed from the Direct Rambus 102 in response to a memory request received from the integrated circuit 103 via the interface controller 106 and buffer 101, is passed through the buffer 101 and output at output 112 to the integrated circuit 103 via the second data bus 105b, together with associated control signals via the second control line 120.

The buffer 101 serves two functions. Firstly, it is able to buffer the memory requests from the integrated circuit 103 to the Direct Rambus 102, allowing the integrated circuit to output a number of memory requests without having to wait for each of those requests to be served by the Direct Rambus 102 before outputting subsequent requests. Secondly, the buffer 101 is able to buffer the data supplied from the Direct Rambus 102 before it is transmitted to the integrated circuit 103. Preferably, the buffer 101 should always have space available to store the accessed data from the Direct Rambus 102 thus enabling the Direct Rambus 102 to always output data at its maximum speed of 16 bits at 800 MHz.

To calculate the required size of the buffer it is assumed that the integrated circuit 103 will output ICY consecutive memory requests. The Direct Rambus 102 will see these as MemY accesses, as MemY=ICY*(integrated circuit internal bus width÷Direct Rambus internal bus width). It is assumed that all of the memory requests are in the same page in the Direct Rambus 102. The Direct Rambus 102 can process MemY−1 memory requests in MemY−1 cycles. During the same time, the integrated circuit 103 can issue X memory requests, where $$X=(MemY-1)*(\text{Direct Rambus bus width}\div ic \text{ bus width})$$

Approximating MemY−1 to MemY we have buffer size (in memory word units)
=MemY−X
=MemY(1−(icclk/memclk)*(icwd/memwd))
where icclk=integrated circuit clock speed, memclk=Direct Rambus clock speed, icwd=integrated circuit internal bus width, and memwd=Direct Rambus internal bus width.

Figure 6:
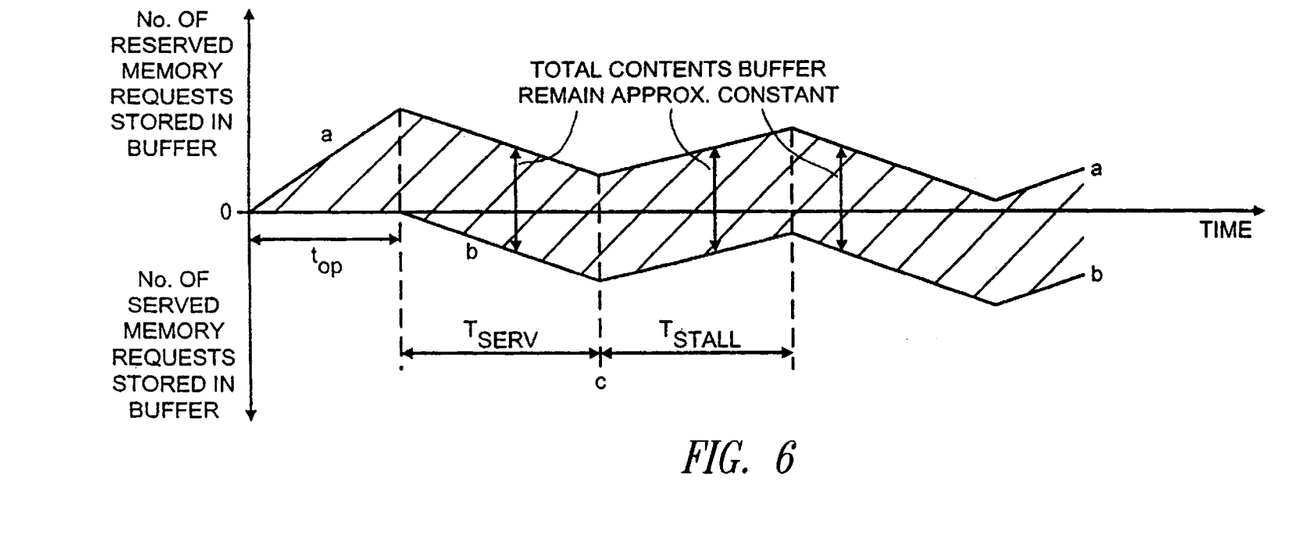
FIG. 6 schematically illustrates how the contents of the interface of FIG. 5 vary with time.

FIG. 6 demonstrates the behaviour of the buffer when the size of the buffer has been correctly chosen. Line a represents the number of memory requests stored in the buffer which are yet to be processed by the memory and line b represents the number of memory requests which have been processed by the memory with the associated data being stored in the buffer. The distance between lines a and b represents the total amount of data stored in the buffer. Initially line a rises sharply over the time period $t_{op}$, as the buffer stores an increasing number of memory requests from the integrated circuit. This initial sharp rise occurs during the delay caused by the memory opening the required page of the first memory request. Once the required page has been opened, the memory is able to output the requested data to the buffer and begin to process the next memory request stored in the buffer. If subsequent memory requests require the same page which is currently open, a number of bursts of requested data may be output to the buffer. Thus, line a begins to fall as the number of memory requests in the buffer falls, and line b begins to fall, representing an increase in the amount of data stored in the buffer. This is indicated on FIG. 5 by the period $t_{serv}$.

At a subsequent point in time, point c, it will be necessary to close the currently open page and open a new page in the memory, causing the delay in outputting data from the memory as previously discussed. The memory is said, at this point, to be 'stalled'. Whilst the memory is stalled lines a and b rise again as the number of memory requests stored in the buffer once again rises and the amount of data stored in the buffer from the memory decreases. This is shown by the period $t_{stall}$. This action continues over time with lines a and b rising and falling together. It can be seen that the distance between lines a and b which represents the total amount of data contained within the buffer remains approximately constant.

Embodiments of the present invention operate particularly advantageously when memory requests are issued by the integrated circuit 103 in short bursts. When this occurs data stored in the buffer in response to memory requests can always be output to the integrated circuit 103 at the same time that the Direct Rambus 102 is stalled during the opening of a further page in the memory. If the number of memory requests issued by the integrated circuit 103 at any one time is too large then when those requests are served by the Direct Rambus 102 the average rate of data transfer will increase to a value which is in excess of the transfer rate of the internal bus within the integrated circuit 103 and the Direct Rambus 102 will be forced to wait for previously served memory requests to be delivered to the integrated circuit before the Direct Rambus can output any further data. However, this occasional loss in performance may not be fatal in some embodiments of the invention to the operation of the integrated circuit, it will be more cost effective in terms of design effort and silicon area consumed to use the buffering arrangement of embodiments of the present invention.

Figure 7:
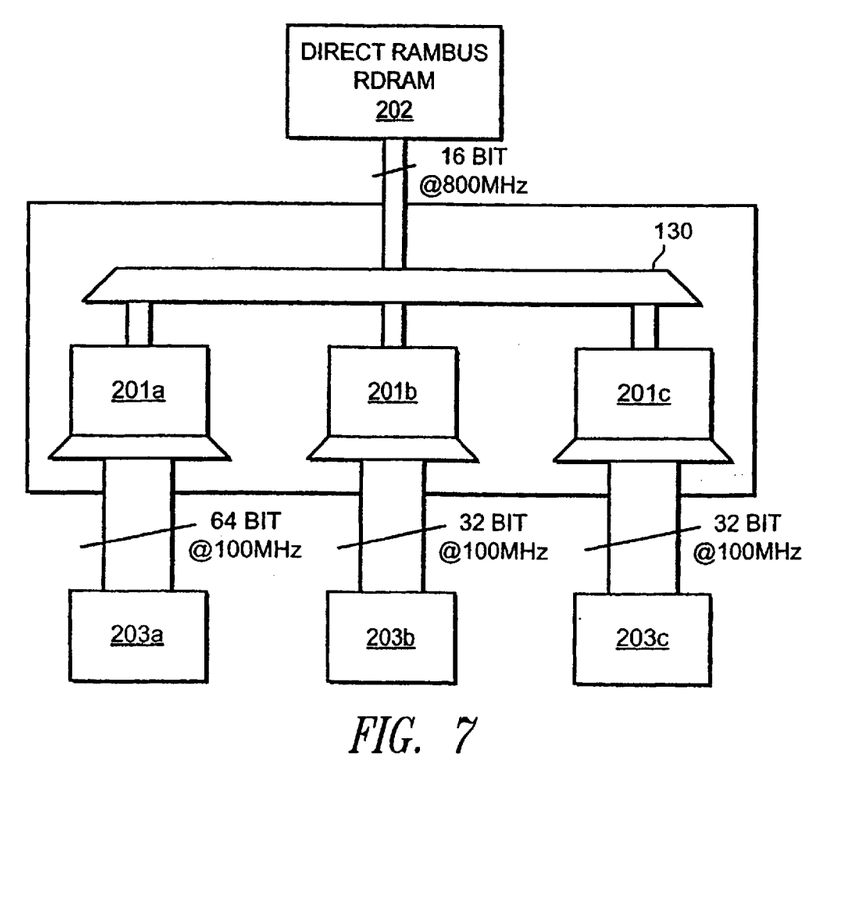
FIG. 7 shows a Direct Rambus connected to a number of integrated circuits via a number of interfaces according to a further embodiment of the present invention.

A further embodiment of the present invention is shown in FIG. 7. In this embodiment a number of buffers 201a, 201b, 201c are connected via a demultiplexer 130 to the output of a Direct Rambus 202. Each of the buffers 201a, 201b and 201c are of the same type as the buffer 101 shown in FIG. 5 and described hereinbefore. Each of the integrated circuits 203a, 203b, 203c is of the same type as integrated circuit 103 shown in FIG. 5. Each buffer is connected to the internal bus of an integrated circuit 203a, 203b, 203c, each of the internal buses having a lower peak data transfer rate than that of the Direct Rambus 202. Each of the integrated circuits may have a different function from each other and may thus make different memory requests to the Direct Rambus 202 at different times. The Direct Rambus 202 provides the data in response to these requests and outputs the data to the demultiplexer 130 which is arranged to route the data to whichever of the buffers 201a, 201b or 201c issued the memory requests. In this embodiment, by providing a number of buffers connected to the Direct Rambus 202 a higher maximum average data transfer rate from the Direct Rambus can be achieved as the data output from the memory is stored in a number of different buffers. If, as shown, the number of buffers provided is three, then this allows three times the maximum average data transfer rate from the Direct Rambus before the Direct Rambus is forced to wait for the slower internal buses of the integrated circuit to retrieve the stored memory data from the relevant buffers.

It will be appreciated that although embodiments of this invention have been described with reference to memory devices, the present invention is equally applicable to any data storage device which outputs data at a high data transfer rate, but in short, relatively infrequent bursts. An example of such an alternative system is a sensor apparatus where sensed information is stored by the sensor and is output to further system elements in periodic bursts of data.

As described hereinbefore, a typical DRAM device comprises a number of banks of memory cells and that delays occur in accessing different pages within a bank.

Figure 8:
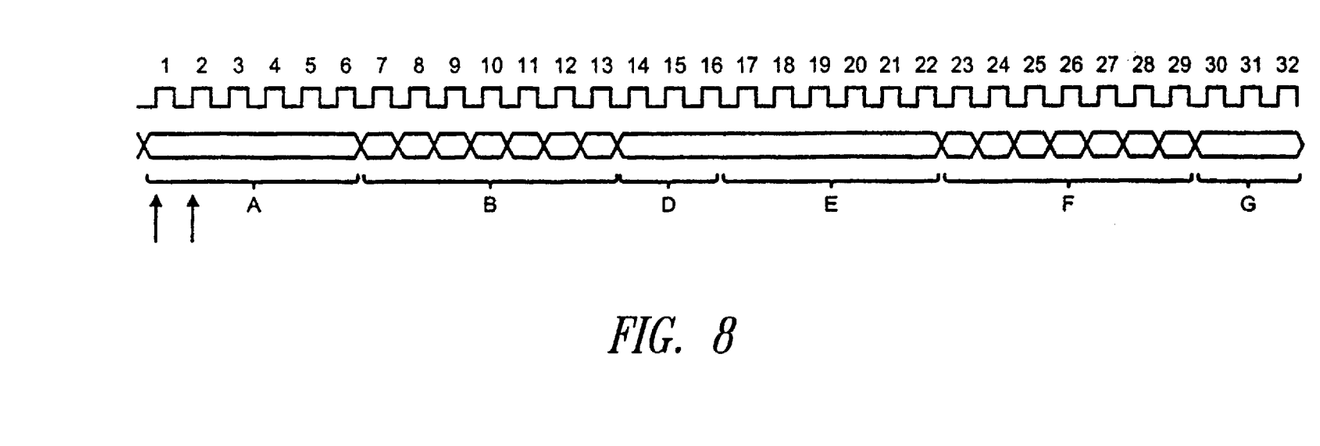
FIG. 8 illustrates the timing of the DRAM of FIG. 3.

Reference will now be made to FIG. 8 which shows a sequence of steps which occurs when eight words from a first selected row R in a first memory bank 31 of a DRAM device as shown in FIG. 3 are read and then eight words from a second selected row in the second memory bank 32 are read. As can be seen, the first six cycles A are used to open the first selected row R and read the first required word in that row of the first memory bank 31. The next seven cycles B are used to read the remaining required seven words in the opened row R. The next three cycles D are required to close the first selected row R in the first bank 31. The next six cycles E are used to open the second selected row R in the second memory bank 32 and read the first required word from that row. The next seven cycles F are required to read the other seven required words in the second selected row. The last three cycles G are required to close the second selected row R in the second memory bank 32. Thus, in order to read eight words from a given row in a memory bank requires 16 cycles even though the reading operation itself only requires 8 cycles. This therefore reduces the efficiency of the memory device and increases the time required in order to complete read and write operations.

It would therefore be advantageous to further reduce the delays in performing read and write operations in respect of a memory having a plurality of memory regions. Circuitry for enabling this function may be provided within the controller 106 of the present invention. It is possible for one memory bank to be accessed whilst the other memory bank was being selected or deselected, such that the number of cycles required to access a burst may be reduced as compared to the prior art described in relation to FIG. 3.

Figure 9:
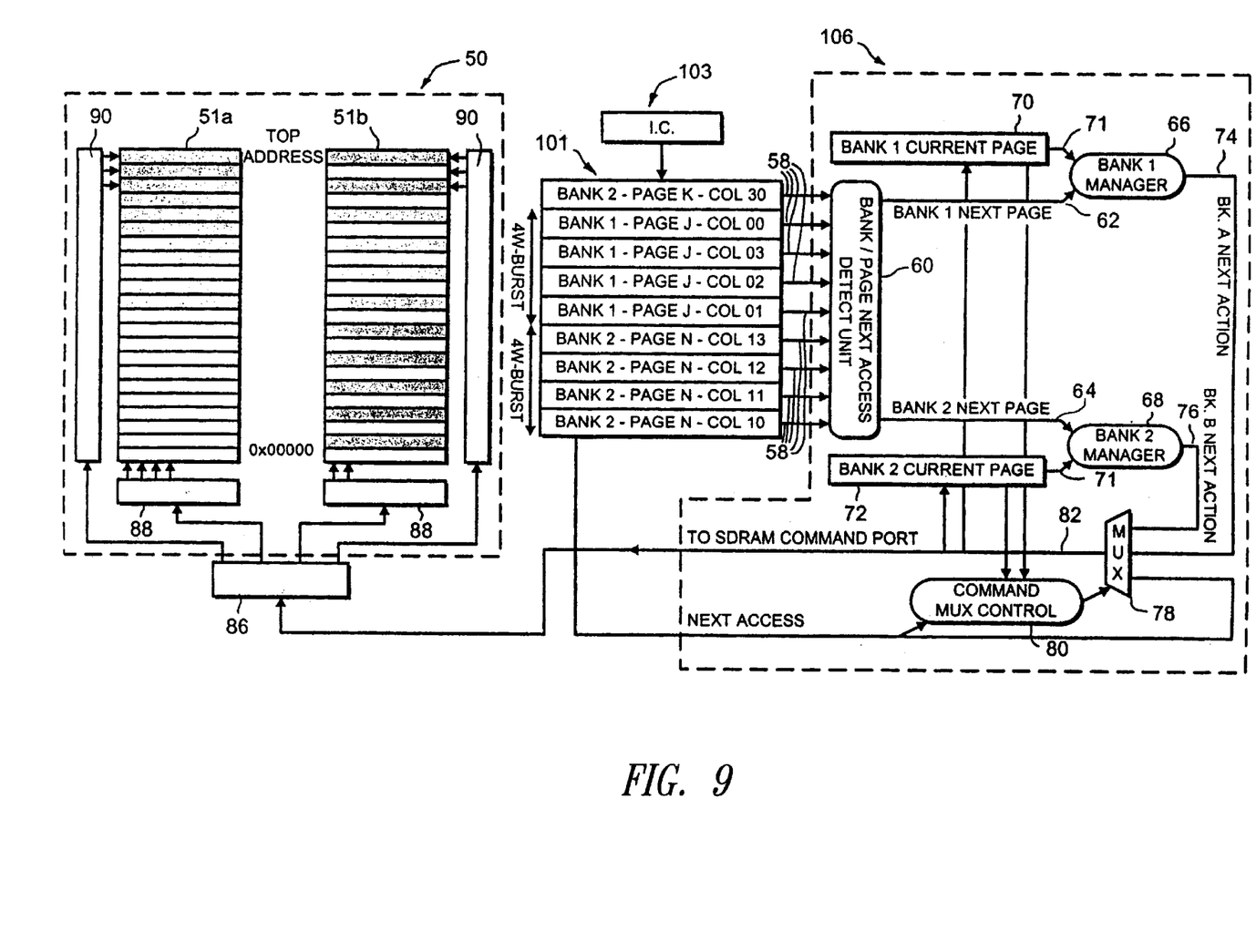
FIG. 9 illustrates an example of the controller shown in FIG. 5, connected to a DRAM device.

Reference will now be made to FIG. 9 which illustrates a controller 106 embodying suitable circuitry in conjunction with a SDRAM 20 and the buffer 101. As with the DRAM shown in FIG. 3, the SDRAM 50 comprises a first and a second memory bank 51a and 52b. Each memory bank 51a and 51b has a plurality of rows and columns which define memory locations. Each memory bank 51a and 51b is also provided with a row control unit 90 and a column control unit 88.

The controller 106 receives requests to access particular locations in the SDRAM from the IC 103 as described with reference to FIG. 5. Each request will identify the memory bank of the SDRAM 50, the row (page) and the column which are to be accessed. The requests output from the IC 103 are input to the buffer 101 where they are stored in the order in which they are received. The requests are output by the buffer 101 in the same order in which they are received.

Each location of the buffer 101 which stores an address provides an output 58 to a detection circuit 60. In the example shown in FIG. 9, the buffer 101 is able to store nine different requests and accordingly the buffer has nine outputs 58 which are connected to the detection circuit 60. The detection circuit 60 is arranged to detect which row (page) in the first bank 51a of the SDRAM 50 is next to be accessed as well as the next page which is to be accessed in the second bank 51b of the SDRAM 50. In the example illustrated in FIG. 9, page N is the next page to be accessed in the second bank 51b whilst page J is the next page to be accessed in the first bank 51a. The detection circuit 60 will generally be a combinatorial logic circuit but can take any other suitable form.

The detection circuit 60 provides two outputs 62 and 64. The first output 62 contains information as to the next page to be accessed in the first bank 51a. The second output 64 contains information as to the next page to be accessed in second bank 51b. The first and second outputs 62 and 64 of the detection circuit 60 are connected to respective bank managers 66 and 68. The first bank manager 66, which receives the first output 62 from the detection circuit 60 also receives a second input 71 from a memory or buffer 70 which stores the current page which is currently open or selected in the first bank 51a. The first bank manager 66 thus compares the page of the first bank 51a which is currently open with the next page of the first bank 51a which is to be accessed. The first bank manager 66 thus determines the next action for the first bank 51a. If the current page which is open and the next page which is to be accessed are the same, the first bank manager 66 will indicate that the next action for the first bank 51a will be the accessing of the required location on the open page or alternatively provide no output. If the current page which is open and the page which is next to be accessed are not the same, the first bank manager 66 will provide an output 74 which indicates that the next action for the first bank 51a will be to close the page which is currently open and then to open the page which is next to be accessed.

In some circumstances, there will be no page which is currently open. The first bank manager 66 will still output the next action which is required at the first bank 51a. In a preferred embodiment of the present invention the first bank manager 66 is arranged to output one action at a time. For example, the first bank manager 66 is arranged to provide an output which indicates that a page is to be closed. The first bank manager 66 is arranged to provide a subsequent output indicating which page in the first bank 51a is to be opened. This subsequent instruction may, but not necessarily be provided when the previous instruction has been completed or is likely to be completed shortly. In one arrangement of the illustrated example each instruction from the first bank manager 66 is output once. In other arrangements, each instruction is output until that instruction is acknowledged.

The second bank manager 68 operates in a similar manner to the first bank manager 66. In particular, the second bank manager 68 receives the second output 64 from the detection circuit and an output 71 from a second memory 72 which stores information as to the page which is currently open in the second bank 51b. As with the first bank manager 66, the second bank manager 68 provides an output 76 which determines the next action for the second bank 51b.

The two outputs 74 and 76 from the first and second bank managers 66 and 68 are input to a multiplexer 78 along with the next request which has the next address which is to be accessed. The next request which is to be accessed is output from the buffer 101 to the multiplexer 78. This next request is the oldest request stored in the buffer 101. The operation of the multiplexer 78 is controlled by a multiplexer controller 80 which arbitrates between the outputs 74 and 76 of the first and second bank managers 66 and 68 and the request output from the buffer 101. The multiplexer controller 80 receives an input from the buffer 101 which provides the next request, an input from the first memory 70 as to which, if any, page is open in the first bank 51a and an input from the second memory 72 as to which, if any, page is currently open in the second bank 51b. Based on this information, the multiplexer controller 80 decides what action should be carried out in the next clock cycle and controls the multiplexer 78. Effectively the multiplexer controller 80 acts as an arbiter and provides a series of commands. Usually, but not necessarily, one command may be provided per clock cycle. An open or close page command may take priority over a read command so that one bank may have a page being opened/closed whilst the other bank is being read. However some commands may include the open and/or close page instruction within a single command with the read/write instructions. In other words, the multiplexer 78 provides a suitable multiplexed output of commands so that, for example, reading of one bank may take place whilst the other bank has a row which is being opened or closed.

The output of the multiplexer 78 is input to a memory input device 86. The output of the multiplexer 78 constitutes the outputs of the memory interface 52. Based on the input, the memory logic device 86 will cause a row to be opened or closed or a location to be accessed (read or written to). The memory logic device 86 controls the row and column control units 88 and 90 in accordance with the output from the controller 106. The location can either be read or written to. The memory logic 86 acts as a, command decoder and also generates the control logic.

Because of the detection circuit 60, it is possible to ensure that a row in one bank can be opened or closed at the same time that a row in the other bank is being read. This significantly reduces the number of cycles taken to complete operations. The column control units 88 controls the accessing of columns of the respective banks. The row control units 90 control the selection and deselection of the rows of the first and second banks 51a and 51b.

The multiplexed output from the multiplexer 78 is received by the memory logic device 86. As discussed hereinbefore, the output of the multiplexer 78 consists of a series of commands which are received by the memory logic device 86.

Figure 10:
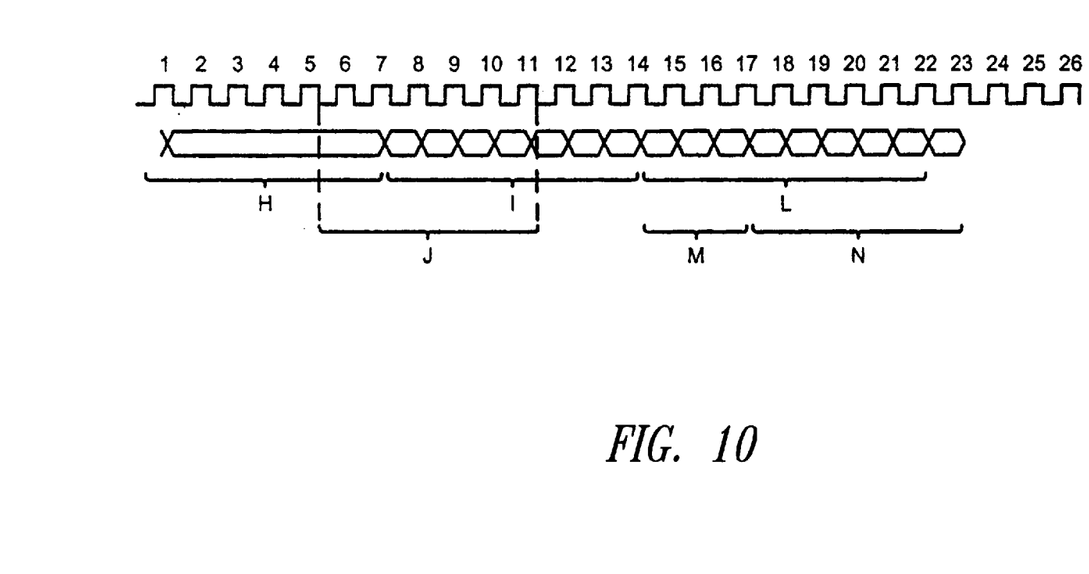
FIG. 10 illustrates the timing of the DRAM device of FIG. 9.

Reference is made to FIG. 10 which shows an example of the timing where two eight word bursts are accessed. Each burst comprises eight words which are located in the same row of the same memory bank. Each burst may be accessed by a single command. The single command may also include the close page instruction. The first and second bursts are located in different banks. For the purposes of illustration, it will be assumed that the first burst requires access to the first bank 51a and the second burst requires access to the second bank 51b. The first six cycles H are required in order to open the required page in the first memory bank 51a for the first word in the first burst. The first word and the first burst is also accessed at the same time. In the next seven cycles I, the remaining seven words of the first burst are accessed. At the same time that the row in the first bank 51a is being opened and subsequently read, the required row in the second bank 51b is also being opened, for example during the five cycles marked J.

Accordingly, when the first burst has been completely accessed, the required row of the second bank 51b can be immediately accessed in order to access the eight words of the second burst, this occurring in the eight cycles marked L. At the same that the second burst is being accessed, the row of the first bank 51a from which the first word was accessed can be closed in the three cycles marked M. In the six cycles marked N, which occur at the same time as five of the cycles marked L in which the words of the second burst are read, the next required row in the first memory bank 51a is opened and the first word of a third burst is read.

Thus, the first two eight word bursts can be read in 21 cycles. This compares favourably with the 29 cycles required with the known DRAM described in relation to FIG. 3. Additionally, any subsequent burst in this mode will only require eight cycles. With the conventional DRAM described in relation to FIG. 3, any subsequent burst requires 16 cycles.

In the described circuitry of FIG. 9, the two banks cannot to read from or written to at the same time. However reading or writing in one bank can take place at the same time that the other bank is having a page opened or closed.

Figure 11:
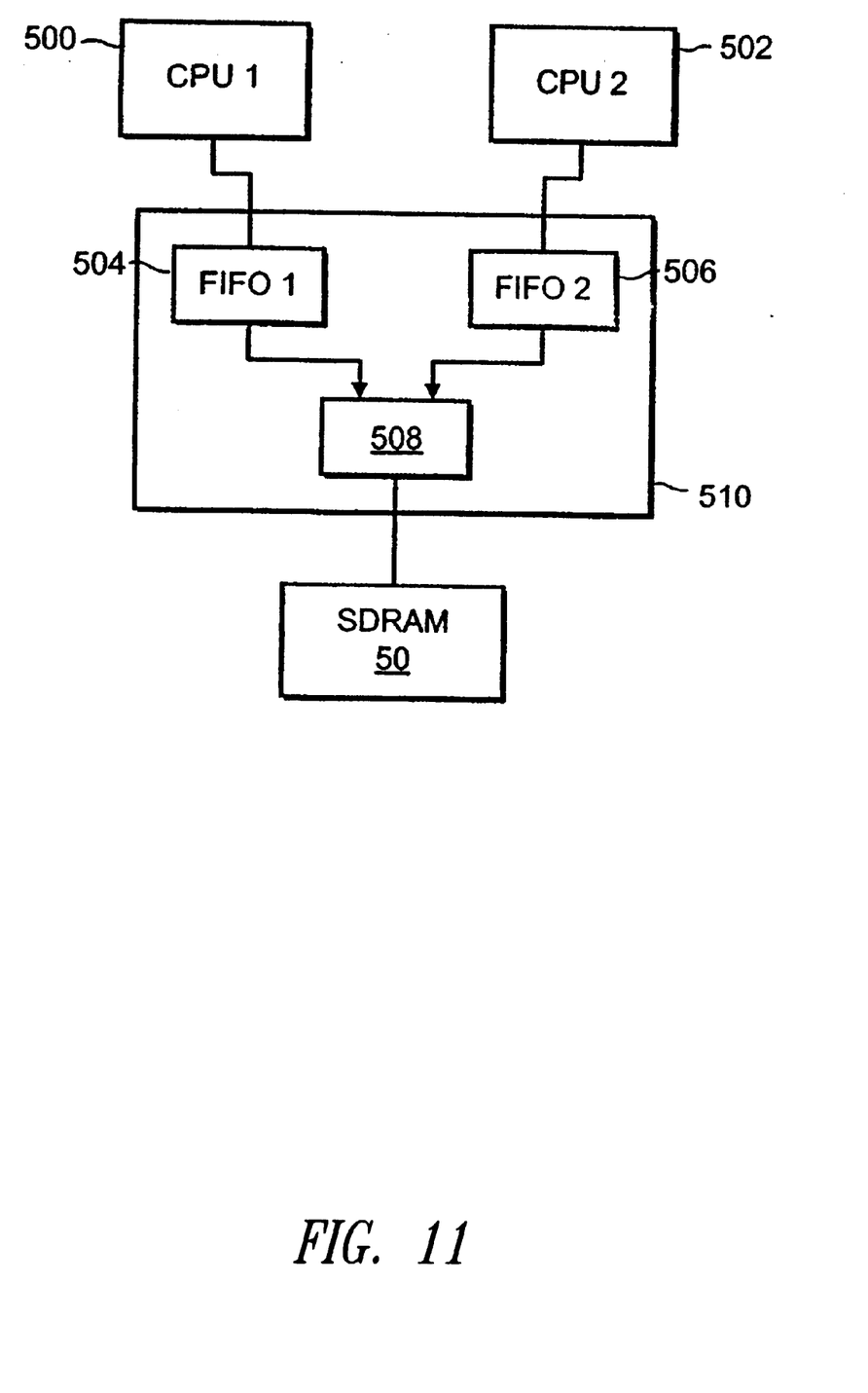
FIG. 11 shows a modified version of the controller and DRAM shown in FIG. 9.

Reference is made to FIG. 11 which shows a modified version of the circuitry described hereinbefore. Two requesters 500 and 502 in the form of CPU1 and CPU2 are provided. The requests from the requesters 500 and 502 are input into respective first and second buffers 504 and 506. These buffers are the same as buffer 101 of FIG. 9. The output of first and second buffers 504 and 506 are input to a common unit 508 which includes the remaining circuitry of the controller 106 of FIG. 9. The detection circuit (not shown), will thus look at the contents of both the first and second buffers 504 and 506 but will otherwise operate in a similar manner to that of FIG. 9. The first and second buffers 504 and 506 and the common unit 508 define a memory interface unit 510. The output of the common unit is input to the memory logic for a SDRAM 50.

In preferred embodiments of the controller 106, a different format is used for addressing the SDRAM. In typical SDRAMs the address is defined by bank, row and column, with the bank part being the most important part of the address and the column being the least important part of the address. In other words, one bank will have locations 0 to n−1 whilst the second bank will have locations n to 2n−1. However, in the controller 106 described hereinbefore, an address format of row, bank and column can be used with the row being the most important part of the address. In other words, the first row of the first bank will contain addresses 0 to M−1 (where M is the number of columns) and the first row of the second bank will have address locations M to 2M−1. The next rows in the first and second banks will have locations 2M to 4M−1 and so on. This means that when data is being written into the memory, the two banks are more likely to be equally used so that the advantages of the controller 106 can be achieved.

The input to the buffer is arranged to receive an input from a plurality of requesters. It is preferred that a respective register be provided for storing the requests from each requester.

In the example described hereinbefore, two banks are shown. However, it should be appreciated that any other suitable number of banks may be provided, for example four.

In the illustrated example, the buffer 101 can have any suitable number of locations.

In one modification to the hereinbefore described circuitry, the detection circuit 60 may be arranged to check that the buffer 101 does not contain any more requests for an open page before closing that page. This may involve reordering of the requests and accordingly additional storage capacity may be required in order to ensure that the information read out of the memory banks is ultimately output in the same order in which the requests are made. The additional memory may be required to receive the output of the memory banks.

It should be appreciated that whilst embodiments of the controller 106 have been described in relation to an SDRAM, the methodology is applicable to any other type of memory which has two separate banks or regions which cannot be accessed at the same time, for example, other types of DRAM.

What is claimed is:

1. Circuitry for controlling a flow of data, comprising:

an operational circuit structured to generate a plurality of data access requests;

data storage circuitry structured to store data and output the data in response to receiving the data access requests;

a buffer coupled to the operational circuit and structured to store simultaneously the data access requests from the operational circuit and store the data output from the data storage circuitry in response to the data access requests; and an interface controller coupled between the data storage circuitry and the buffer and structured to transmit the data access requests from the buffer to the data storage circuitry and to transmit the data from the data storage circuitry to the buffer.

2. The circuitry of claim 1 wherein the buffer includes n data storage locations for the simultaneous storage of the data access requests, the circuitry further comprising n data transfer lines coupling the respective data storage locations of the buffer to the interface controller, such that there is a one to one relationship between the data storage locations in the buffer and the data transfer lines.

3. The circuitry of claim 1, further comprising a first data bus coupling the buffer to the operational circuit and a second data bus coupling the buffer to the data storage circuitry, wherein, in use, the first data bus has a maximum data transfer rate having a different value than a maximum data transfer rate of the second data bus.

4. The circuitry of claim 1 wherein the operational circuit is a first operational circuit, the plurality of data access requests is a first plurality of data access requests, and the buffer is a first buffer, the circuitry further comprising:

a second operational circuit structured to generate a second plurality of data access requests; and a second buffer coupled to the second operational circuit and structured to store the data access requests from the second operational circuit and store data output from the data storage circuitry in response to the second data access requests.

5. The circuitry of claim 4 wherein the interface controller couples the data storage circuitry to both of the first and second buffers.

* * * * *